United States Patent

[11] 3,575,424

| [72] | Inventor | Ernest J. Taschenberg<br>Baltimore, Md. |
|---|---|---|
| [21] | Appl. No. | 880,649 |
| [22] | Filed | Nov. 28, 1969 |
| [45] | Patented | Apr. 20, 1971 |
| [73] | Assignee | Koppers Company, Inc. |

[54] PRESSURE BALANCED CIRCUMFERENTIAL SEAL ASSEMBLY
6 Claims, 7 Drawing Figs.

[52] U.S. Cl. ............................................. 277/27,
277/71, 277/142, 277/154
[51] Int. Cl. ............................................. F16j 15/16,
F16j 15/54
[50] Field of Search ............................................. 277/71, 27,
137, 142, 154

[56] References Cited
UNITED STATES PATENTS

| 2,908,516 | 10/1959 | Stein | 277/142X |
| 2,956,824 | 10/1960 | Kuchler et al. | 277/68 |
| 3,271,037 | 9/1966 | Hammond | 277/27 |
| 3,305,241 | 2/1967 | Hart | 277/27 |

*Primary Examiner*—Samuel Rothberg
*Attorneys*—Boyce C. Dent, Oscar B. Brumback and Olin E. Williams ABSTRACT: A segmental circumferential shaft seal is provided to maintain axial and radial balance by using the distribution of fluid pressure forces applied to opposing surfaces of the seal. Compensation for radial balance is also provided at the junctions of the adjoining segments. The result is a low wear, low leakage seal having substantially low uniform contact pressure against a rotating shaft regardless of the pressure ratio across the seal.

INVENTOR.
ERNEST J. TASCHENBERG
BY
ATTORNEY

Patented April 20, 1971

INVENTOR.
ERNEST J. TASCHENBERG
BY Bayne C. Dent
Attorney

INVENTOR.
ERNEST J. TASCHENBERG
BY Boyce C. Dent
ATTORNEY

PRESSURE BALANCED CIRCUMFERENTIAL SEAL ASSEMBLY

BACKGROUND OF THE INVENTION

1. Field of the Invention

This invention relates generally to joint packing and particularly to pressure responsive loading means in relation to a circumferential seal in balanced contact with a rotating shaft.

2. Description of the Prior Art

Conventionally, circumferential seals (or bore contact seals) were developed in conjunction with the evolution of gas turbine technology as a means of effecting a dry, substantially fluid-tight seal about the circumference of a rotating shaft. Circumferential seals are generally made as a segmented ring comprising a low-friction material such as carbon with a bore size provided to accommodate a corresponding shaft size. The segments are maintained in substantially fluid-tight sealing contact with the rotating shaft by a conventional garter spring restraint. The sealing arrangement is integrated into a housing and separates areas having a substantial pressure difference.

Problems arising in conventional seals involve common difficulties such as balance, wear and adequate structural soundness. Prior circumferential seals in general have inherent pressure imbalance which causes excessive wear rates thus limiting the life of the seal. Advancements in the field of gas turbine technology demand increased seal life. The inherent problem of pressure imbalance appears to be the main source of difficulty in providing an improved seal and subsequent attempts have been made to overcome this problem.

A partial solution to the problem of pressure imbalance is described in U.S. Pat. No. 2,956,824 to Kuchler's wherein it is disclosed that by means of a plurality of communicating axial and radial grooves, a substantial degree of axial and radial pressure imbalance can be reduced although a pressure differential exists across the sealing ring. Kuchler's solution offered a significant advance in reducing the problem; however, it has been found that a substantial degree of pressure imbalance still exists in seals made in accordance with the Kuchler Patent.

Another approach to the problem of pressure imbalance is presented in U.S. Pat. No. 3,093,382 to Macks wherein a balanced seal is disclosed which has no contacting surfaces. Macks attempts to balance the seal in the axial direction by opposing one force (the product of pressure times area at opposed faces of the seal) with an axially resilient means. Dependent upon the nature of this force, the resilient means may be designed either to provide an opposing force in tension to minimize wear or in compression to minimize fluid leakage. The disadvantage is that the same resilient means is incapable of minimizing both leakage and wear simultaneously. In addition, the pressure imbalance increases if the fluid pressure is increased or pulsates.

In the U.S. Pat. No. 3,271,037 to Hammond and the U.S. Pat. No. 2,908,516 to Stein it is disclosed that a certain degree of axial and radial balance is achieved by directing high pressure to each of the opposing axial and radial faces thereby allowing high pressure to reach the O.D. (outside diameter) of the segmental sealing ring. However, in each of these patents only the direct high pressure acting on specific surface areas of the seal ring is utilized.

In publication number 670062 of the SAE (Society of Automotive Engineers) entitled: "The Circumferential Seal: Its Application, Its Place in the Seal Spectrum Relative to Gas Turbines," a seal assembly comprising 3 rings is provided (refer to FIG. 22, page 8) with a means for permitting high pressure to pass through bores provided in the primary sealing ring. This arrangement offered a substantial solution to the balanced seal problem except that an undesirable amount of high pressure fluid was permitted to pass to the area surrounding the outer circumferential surface of the primary seal.

SUMMARY

Accordingly, the object of the present invention is to provide a seal assembly which is axially and radially balanced, despite the existence of a pressure differential across the seal in the axial direction along a rotating shaft, which has a minimum of wear and leakage.

In accordance with this invention, there is provided a seal ring assembly, the structure of which utilizes not only direct pressure forces, or direct pressure times area forces (PA), acting on opposing radial and circumferential faces of the seal, but in addition utilizes pressure breakdown forces, or Lambda pressure times area (LPA), across the contacting sealing surfaces where L is a function of the pressure ratio of the upstream, P1, and downstream, Po, pressures.

The present invention also utilizes the radial forces acting on the end gaps between the sealing ring segments which would otherwise tend to unseat the sealing ring thus causing excessive leakage across the seal. The resultant forces are balanced to permit the axial and radial seating forces to slightly exceed the axial and radial lifting forces thus creating a seating bias which provides a seal having minimum leakage and wear.

These and other objects and novel features are accomplished by providing a seal assembly for use within a housing that has a high pressure and a low pressure side. The seal assembly has a first shoulder adjacent to the low pressure side. A segmental primary seal ring in the seal assembly surrounds the circumference of a rotating shaft and has sealing and nonsealing surfaces on opposing faces and forms a first sealing interface with the first shoulder. A secondary seal ring or backup ring in the seal assembly forms a second sealing interface with the primary seal. A bellows diaphragm connects the secondary seal with a second shoulder of the seal assembly adjacent the high pressure side thereby preventing the passage of high pressure fluid to an area surrounding the outer circumference of the primary and secondary seals. Passageways or fluid paths within the seal assembly permit the flow of high and low pressure to fluidly connect areas of the sealing assembly to achieve pressure balancing in conjunction with the surfaces against which the pressures act.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

BRIEF DESCRIPTION OF THE DRAWINGS

In the drawings wherein like parts are marked alike.

DESCRIPTION OF THE PREFERRED EMBODIMENT

Figure 1:
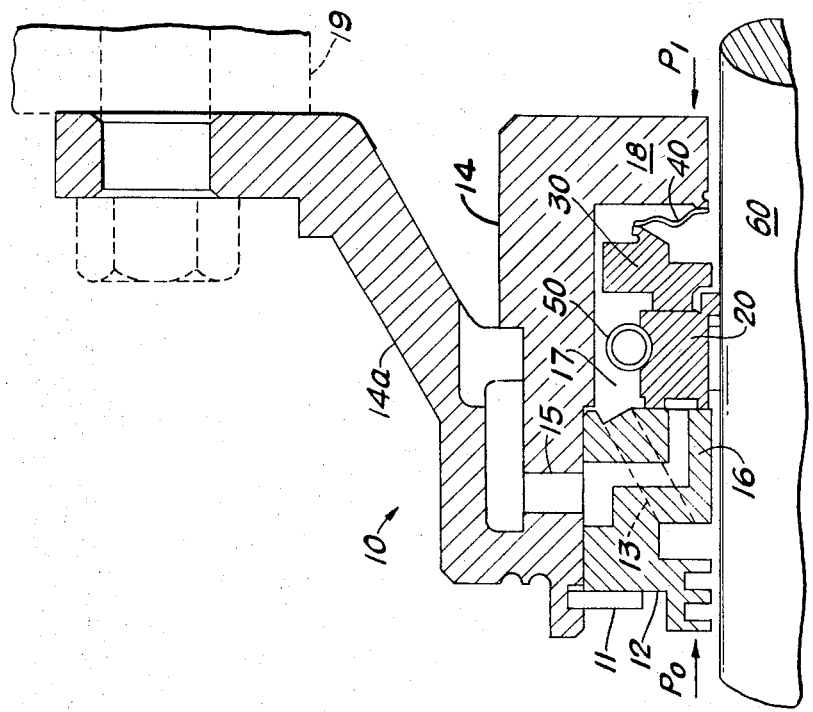
FIG. 1 is a cross-sectional view of an embodiment of the seal assembly as viewed radially along a shaft.

Referring to FIG. 1, the overall seal assembly is designated 10. Seal enclosure 14 for the assembly 10 includes a flange portion 14a for mounting within housing 19 in the conventional manner. Seal assembly 10 includes windback 12 which is press-fitted within seal enclosure 14 and thereby forms first shoulder 16. Windback 12 is retained within enclosure 14 by a conventional snap ring 11. Seal enclosure 14 includes second shoulder 18 axially spaced from first shoulder 16 along shaft 60 thus forming cavity 17. Within cavity 17 are primary seal ring 20 with garter spring restraint 50, backup or secondary ring 30 and bellows diaphragm 40 which is attached to backup ring 30 and second shoulder 18 in fluid-tight connection such as by welding. First shoulder 16 is adjacent a low pressure or downstream side, Po, of assembly 10 and second shoulder 18 is adjacent a high pressure or upstream side, P1. Assembly 10 is adapted to concentrically surround a rotating shaft 60.

Figure 2:
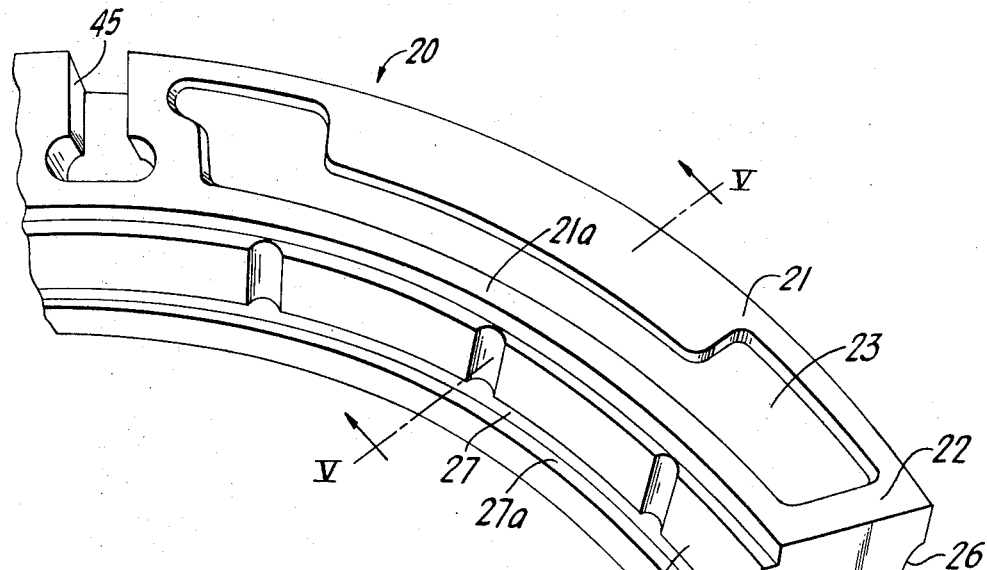
FIG. 2 is a perspective view of the male end of a section of the primary seal ring segment of FIG. 1.
Figure 3:
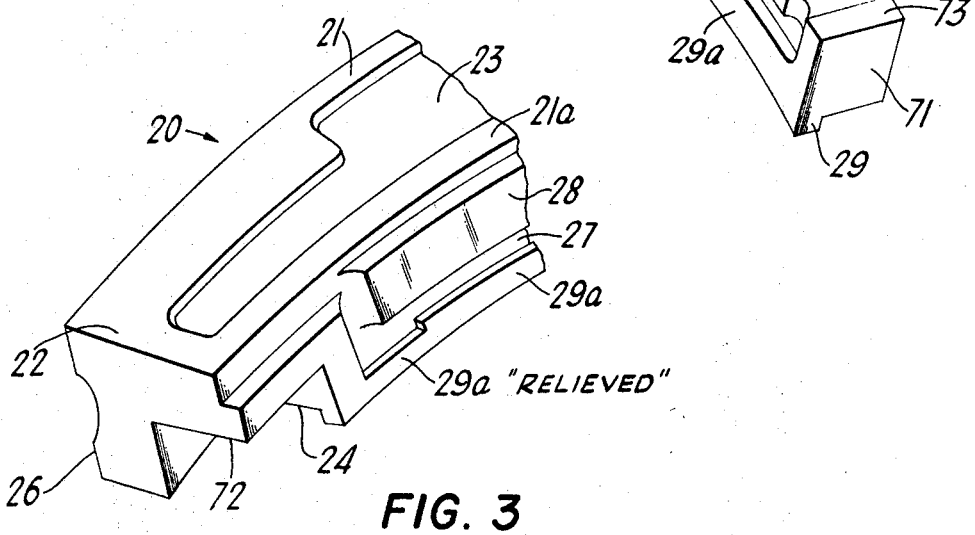
FIG. 3 is a perspective view of the female end of a section of the primary seal ring segment of FIG. 2.

Primary seal ring 20 includes a plurality of individual segments. Each segment has a male end 71 and a female end 72 for accommodating adjoining segments, as shown in FIGS. 2 and 3. The inner circumferential surface 28 is adjacent to the shaft 60. Each segment also includes a first radial face 22, a second radial face 24, and an outer circumferential surface 26.

Figure 7:
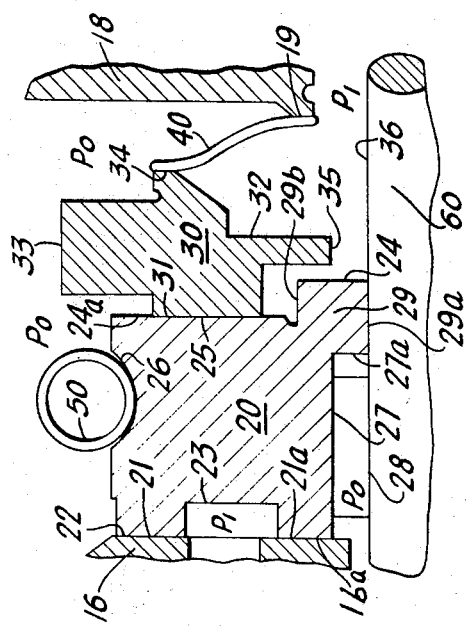
FIG. 7 is an enlarged cross section of a portion of the seal ring assembly showing the relationship of the parts therein.

The first radial face 22 has sealing surfaces 21 and 21a for sealing against the first shoulder 16 and nonsealing surface 23 forms a pocket or groove in first radial face 22 for receiving the desired amount of high pressure air, FIG. 7. A first sealing interface is formed by surfaces 21 and 21a with surface 17 of shoulder 16.

A second radial face 24 includes a sealing surface 25 which engages surface 31 of backup ring 30 forming a second sealing interface on the upstream side of seal 20. Inner circumferential surface 28, a nonsealing surface of primary seal 20, includes surfaces 27 and 27a exposed to low pressure Po, and seal dam 29 having an inner circumferential surface 29a which engages the outer circumferential surface 36 of rotating shaft 60 thereby separating high pressure P1 and low pressure Po along shaft 60. Seal dam 29 also includes an outer circumferential surface 29b opposite surface 29a and exposed to high pressure forces P1. The outer circumferential surface 26 of seal 20 is exposed to low pressure Po. Surface 26 is circumferentially engaged by a conventional garter spring restraint 50 which exerts a substantially uniform force radially inwardly toward shaft 60.

Backup ring 30 does not engage shaft 60 and is held in a concentric position about shaft 60 by bellows 40. The major surfaces of backup ring 30 are: surface 31, which engages surface 25 of seal ring 20; surface 32, which is exposed to P1; and surface 33 which is exposed to Po. The action of pressure P1 on surface 32 results in an axial force exerted in the direction of seal ring 20, thus tending to drive seal ring 20 against shoulder 16.

Bellows 40 is a resilient member attached in fluid-tight connection to a small radial face 34 on the upstream side of backup ring 30 and thereby defines the junction of surfaces 32 and 33. The opposite end of bellows 40 is similarly attached to a flange 19 of shoulder 18. This arrangement prevents a high pressure P1 from leaking to the outer circumferential surface of seal ring 20. Furthermore, bellows 40 and backup ring 30 provide the necessary flexibility needed within cavity 17 to allow for the accumulation of tolerances and differences in thermal expansion while providing an effective sealing arrangement.

Hydraulic fluid forces which act on seal ring 20 are the product of direct pressure times area and pressure breakdown times area. These hydraulic forces are substantially balanced in the seal assembly described herein. Structural forces acting on seal ring 20 are provided to apply predetermined seating forces in the desired direction. For example, garter spring restraint 50 applies a radially inwardly directed force which tends to seat sealing surface 29a against shaft 60, FIG. 4. Bellows 40 applies an axial force which tends to seat sealing surface 21 and 21a against surface 16a in the downstream direction. These seating or structural forces urge seal ring 20 in sealing engagement with the appropriate coacting surfaces. Backup ring 30, FIG. 7, is hydraulically balanced similarly to seal ring 20 with respect to bellows 40. That is, the forces due to pressure times area and Lambda pressure times area acting on opposing surfaces tend to axially balance backup ring 30. The structural or seating force applied by bellows 40 maintains surface 31 of backup ring 30 in sealing engagement with surface 25 of seal ring 20. This force then tends to seat seal ring 20 against shoulder 16.

As shown in FIG. 1, a series of passageways 15 allow the passage of high pressure P1 from the upstream side through the seal enclosure 14 including first shoulder 16 thereby directing high pressure P1 to the first radial face of seal ring 20. Thus, high pressure P1 is applied to surface 23, FIG. 7, to exert a force tending to drive seal ring 20 to the right (as shown in the drawing). This force is the product of P1 times the area of surface 23. It is evident, thus, that the action of pressure P1 on surface 23 is in opposition to the action of pressure P1 on the surface 24 of seal 20. The net effect of these opposed actions of P1 on both sides of seal ring 20 tends to balance seal ring 20 with respect to the effect of the high pressure at the right-hand side of the ring. Thus, the seal ring 20 is substantially axially balanced with respect to the direct pressure forces acting thereon even though the magnitude of pressure P1 changes or pulsates.

Indirect pressure forces or pressure breakdown forces (LPA) act on sealing surfaces of the seal at the interface between them and coacting surfaces. These surfaces do not receive direct pressure acting against them, but due to the fact that they separate a high pressure area from a low pressure area, there is a pressure breakdown acting on them as illustrated diagrammatically in FIG. 4 as force $a$ acting on surface 29a, and also in FIG. 5 as force $b$, acting on surface 25, and forces $e$ and $g$ acting on surfaces 21 and 21a respectively. The axially directed pressure breakdown forces acting on sealing surfaces 21 and 21a are provided to counterbalance the pressure breakdown forces acting on surface 25. Thus, the seal ring 20 is substantially axially balanced with respect to the pressure breakdown forces.

Seal ring 20 is also balanced radially. However, since there are no sealing surfaces on outer circumferential surface 26, radial balance is accomplished by the summation of radially inwardly acting direct pressure forces, or PA forces, provided to counterbalance radially outwardly acting direct pressure forces and radially outwardly acting pressure breakdown forces, or PA forces and LPA forces.

Figure 4:
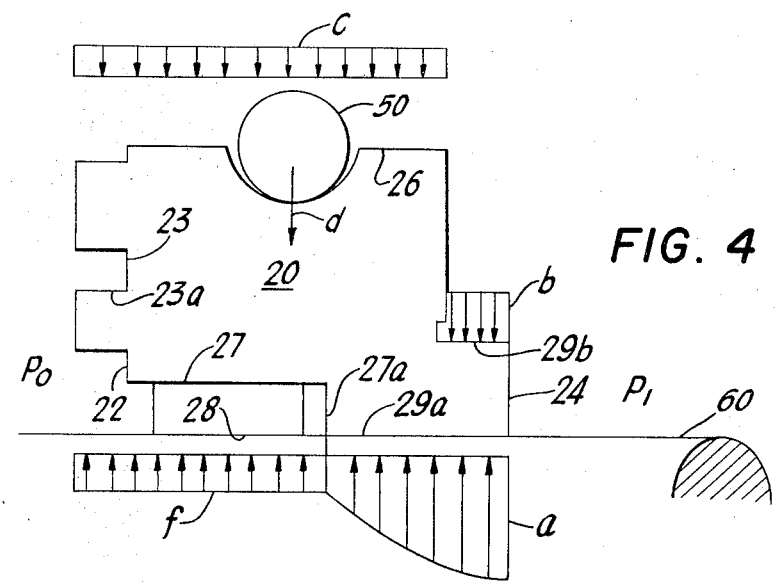
FIG. 4 is a graphical representation of a cross section of the seal ring of FIG. 1 showing the distribution of opposing radial forces.

A series of passageways 13, FIG. 1, are provided through shoulder 16 thereby allowing the passage of low pressure, Po, to the area surrounding the outer circumferential surface 26 of seal ring 20, FIG. 4. Low pressure, Po, acting on outer circumferential surface 26, and high pressure, P1, acting on surface 29b, exert a force radially inwardly toward shaft 60. Low pressure, Po, is applied to inner circumferential surface 28 and pressure breakdown forces are applied to sealing surface 29a tending to drive seal ring 20 radially outwardly from shaft 60 (as shown in the drawing) in opposition to the forces applied to outer circumferential surface 26 by low pressure Po. The net effect of these opposed forces tends to balance seal ring 20 with respect to the effect of low pressure, Po, times the exposed area of surfaces 26 and 28, high pressure, P1, times the exposed area of surface 29b and pressure breakdown forces, LP, times the area of sealing surface 29a. Thus, seal ring 20 is substantially radially balanced with respect to hydraulic fluid forces acting thereon.

Passageways 15 may be bored through seal enclosure 14 in a concentric array, relative to shaft 60, and passageways 13 may likewise be provided in windback 12 thus permitting high pressure, P1, and low pressure, Po, to be fluidly connected with the desired areas of seal assembly 10. Both passageways 13 and 15 must provide sufficient flow area to permit the fluids therein to flow with substantially zero pressure drop from one end to the other.

The arrangement herein described provides the desired application of pressures Po and P1, both directly and indirectly, to the surfaces of seal ring 20. Both high pressure P1 and low pressure Po are directed into contact with a desired amount of the surface of seal ring 20. Referring to FIG. 4, for example, where high pressure P1 is exerted on a first portion of the seal and low pressure Po is exerted on the second portion of a seal with a sealing surface 29a therebetween, a pressure breakdown tends to occur across that sealing interface. A reduction in the area of this sealing surface results in a reduction of the pressure breakdown forces. In the present invention, sealing surfaces are provided to effect such pressure breakdown forces as a function of the pressure ratio of the upstream and downstream pressures. The summation of forces, both axially and radially, are the sum of direct pressure to the nonsealing surfaces and the indirect or pressure breakdown forces across the sealing surface of the seal ring.

Referring now to FIG. 4, which graphically represents the radial forces acting substantially uniformly on seal ring 20, the forces acting radially outwardly include:
 a. indirect pressure breakdown forces acting across sealing surface 29a; and
 f. substantially uniformly distributed direct low pressure forces, Po, acting on inner nonsealing surface 27.

Forces acting radially inwardly include:
 b. direct high pressure forces acting on surface 29b of seal dam 29;
 c. substantially uniformly distributed direct low pressure forces acting on outer circumferential surface 26; and
 d. direct pressure applied substantially uniformly by garter spring restraint 50.

Advantageously, the sum of the above hydraulic and mechanical forces is balanced to produce a substantially low seating bias directed radially inwardly toward shaft 60, or, the summation of forces of $a+f$ is less than the summation of forces of $b+c+d$.

Figure 5:
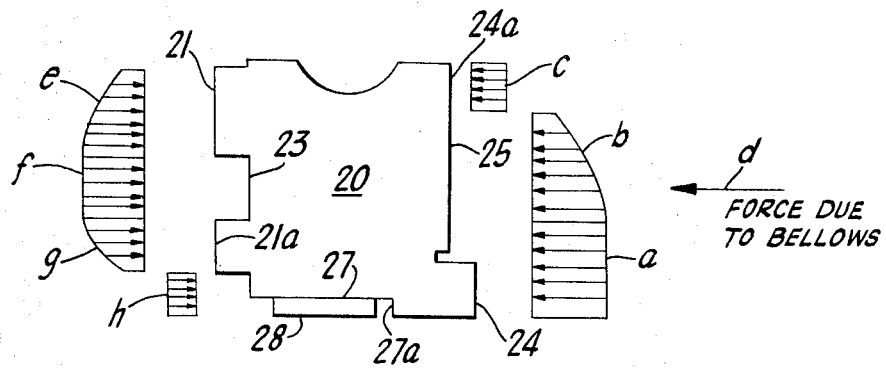
FIG. 5 is a graphical representation of a cross section of the seal ring taken along line 5—5 of FIG. 2 showing the distribution of opposing axial forces.

Similarly, FIG. 5 represents the axial forces acting on seal ring 20 wherein forces acting in the downstream direction include:
 a. substantially uniformly directed high pressure forces acting directly on second radial face 24;
 b. indirect pressure breakdown forces acting across the second interface where surface 31 of backup ring 30 and surface 25 of seal ring 20 engage;
 c. substantially uniformly directed low pressure forces acting directly on second radial face 24a; and
 d. mechanical pressure applied by bellows 40.

Forces acting axially in the direction of upstream pressure include:
 e. indirect high pressure breakdown forces acting across sealing surface 21;
 f. substantially uniformly distributed direct high pressure forces acting on nonsealing surfaces 23;
 g. indirect high pressure breakdown forces acting across sealing surface 21a; and
 h. substantially uniformly distributed direct low pressure forces acting on nonsealing surface 27a.

Advantageously, the sum of these hydraulic and mechanical forces is balanced to produce a substantially low seating bias directed axially toward shoulder 16, or, the summation of forces of $a+b+c+d$ is greater than the summation of forces of $e+f+g+h$.

Figure 6:
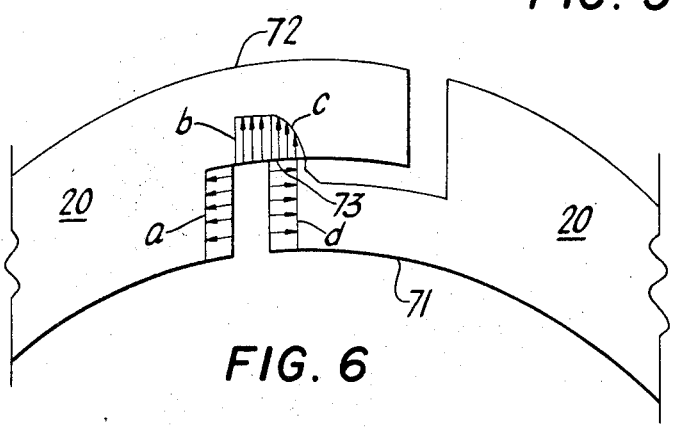
FIG. 6 is a graphical representation of the adjoining male and female ends of two segments of the seal ring including the radial forces acting on the seal ring at that point.

FIG. 6 shows forces acting on the segment joints of seal ring 20. Here, due to the joints between segments of the entire seal ring, high pressure forces enter the substantially small separation between male joint 71 and female joint 72. These forces include:
 a. substantially uniformly distributed direct high pressure forces acting on female joint 72;
 b. substantially uniformly distributed direct high pressure forces acting on female joint 72;
 c. indirect high pressure breakdown forces across joint sealing dam 73 acting on female joint 72; and
 d. substantially uniformly distributed direct high pressure forces acting on male joint 71.

The resultant of these forces can be considered as a single vector directed radially outwardly from the center of shaft 60 which resultant force tends to lift or unseat the female end of the seal ring segment thus permitting leakage at this point and requiring, in accordance with this invention, only a local correction. The resultant force is compensated for by relieving a portion of the sealing dam, that is, the inner sealing surface 29a at the female end 72, FIG. 3, thus reducing the area thereof causing a subsequent reduction in high pressure breakdown forces acting radially outwardly on that reduced surface. Accordingly, there being no change in forces directed radially inwardly, the result is an increase in the seating bias at the female joint proportional to the decrease in radially outwardly directed forces.

Accordingly, local corrections are made in the first radial face 22 of primary ring 20 by reducing or enlarging the sealing surfaces 21 and 21a, FIGS. 2 and 3. Such variations in first radial face 22 will subsequently vary the hydraulic axial force distribution across the face as illustrated in FIG. 5 as forces $e$, $f$, and $g$. In this manner, the hydraulic axial forces may be maintained to substantially balance each segment of seal ring 20 with respect to fluid force components in each segment such as male end 71, female end 72, and antirotation lock aperture 45.

Antirotation lock aperture 45, FIG. 2, accommodates a locking pin (no shown) fastened to and protruding from shoulder 16. Thus, seal 20 is prevented from rotating with shaft 60. The antirotation lock system is proportioned to permit radial movement of seal 20 relative to assembly 10. Shaft 60 is free to move axially to a substantial degree and there is only slight relative radial motion of shaft 60 and assembly 10, however, the flexible arrangement of seal 20 gives maximum sealing and minimum wear notwithstanding the axial and radial movement of rotating shaft 60.

In operation, high pressure fluid, P1, in the upstream regions of seal assembly 10 fills the voids accessible to this fluid. Pressure, P1, along the outer surface of shaft 60 is applied to surface 32 of backup ring 30. This same high pressure fluid is prevented from passing to the region surrounding the outer circumferential surface 26 of seal 20 by bellows 40. The pressure exerted on surface 32 forces surface 31 of backup ring 30 into sealing engagement with portion 25 of second radial face 24 thus forming the second radial interface. Also, pressure P1 passes between the inner circumferential surface 35 of ring 30 and the outer circumferential surface 36 of shaft 60 thereby applying direct pressure to second radial face 24. In addition, the mechanical force applied to backup ring 30 by bellows 40 biases seal ring 20 in the downstream direction. The combination of these forces is transmitted through seal ring 20 causing seal ring 20 to be biased in sealing engagement with shoulder 16. By means of the passageways 15, pressure P1 is permitted to pass through seal enclosure 14 and windback 12 including shoulder 16 whereby a force is applied directly to the first radial face 22 of seal ring 20. The force axially applied to the first radial face hydraulically balances seal ring 20 so as not to overcome the bias in the downstream direction exerted by bellows 40.

Low pressure Po communicates with inner circumferential surfaces 28 of seal 20 and applies radially outwardly acting hydraulic forces. By means of passageways 13, pressure Po enters the area surrounding outer circumferential surface 26 of seal 20 and applies radially inwardly acting hydraulic forces which tend to balance seal ring 20. In addition, garter spring restraint 50, which engages the outer circumferential surface 26, applies a mechanical force radially inwardly thus tending to bias seal 20 toward shaft 60. The forces applied to the inner and outer circumferential surfaces tend to hydraulically balance seal ring 20 radially with respect to radial forces acting thereon so as not to overcome the bias exerted by garter spring restraint 50.

The surfaces 22 and 28 are biased sufficiently to substantially limit leakage without causing a high wear rate of such surfaces due to high frictional forces between relatively moving surfaces.

As shaft 60 rotates, there is substantially small axial and radial movement relative to seal assembly 10. Antirotation lock 45 prevents ring 20 from rotating with the shaft and allows seal ring 20 to move radially relative to seal assembly 10. This flexibility permits seal ring 20 to maintain effective axial and radial sealing despite movement relative to shaft 60 and assembly 10.

The foregoing has described a novel balanced circumferential seal ring assembly which is continuously axially and radially balanced by fluid pressure, including means to maintain a constant low seating bias thereby substantially limiting leakage and wear at the sealing surfaces.

Having thus described the invention in its best embodiment and mode of operation, that which is desired to be claimed by Letters Patent is:

I claim:

1. A circumferential seal assembly adapted for mounting in a housing and around a shaft passing through said housing for sealing against the passage of high fluid pressure along said shaft from an upstream to a downstream side of said housing, said assembly comprising:

a first annular shoulder adjacent said downstream side of said housing and a second annular shoulder spaced from said first shoulder along said shaft adjacent said upstream side defining an annular cavity within said seal assembly surrounding said shaft and in fluid communication with said downstream and upstream sides of said housing through first and second annular spaces defined by said first and second shoulders respectively with said shaft;

a segmented primary seal ring between said first and second shoulders and having a downstream surface portion in sealing engagement with said first shoulder and an inner surface in sealing engagement with said shaft;

a backup ring between said primary ring and said second shoulder in sealing engagement with said primary ring;

a first annular fluid-tight resilient means connected to said backup ring and said second shoulder for urging said backup ring against said primary ring, and for urging said primary ring against said first shoulder to maintain the same in static sealing engagement, and for forming a first fluid path for directing said high pressure against an upstream and downstream surface portion of said backup ring;

a second annular resilient means in engagement with the outer circumference of said primary ring urging said primary ring into dynamic sealing engagement with said shaft for sealing against the passage of said high fluid pressure from said upstream side to said downstream side of said housing along said shaft;

said backup ring defining a third annular space with said shaft for directing said high pressure from said first fluid path against both an upstream and a downstream surface portion of said backup ring to provide opposed counterbalancing fluid forces acting axially on said backup ring and for directing said high pressure against an upstream surface portion of said primary seal ring; and a second fluid path formed in said first shoulder in fluid communication with said upstream side for directing said high fluid pressure against said downstream surface portion of said primary seal ring to provide a counterbalancing fluid force axially opposing said high pressure acting on said upstream surface portion of said primary seal ring;

whereby said primary seal ring remains substantially axially balanced regardless of changes in differential pressure between said upstream and downstream sides of said housing.

2. A circumferential seal assembly adapted for mounting in a housing and around a shaft passing through said housing for sealing against the passage of high fluid pressure along said shaft from an upstream to a downstream side of said housing, said assembly comprising:

a first annular shoulder adjacent said downstream side having an inner circumferential face spaced from said shaft to permit the passage of low fluid pressure therebetween;

a second annular shoulder adjacent said upstream side and spaced from said first shoulder along said shaft and having an inner circumferential face spaced from said shaft to permit the passage of high fluid pressure therebetween;

a segmented primary seal ring having:

a downstream side-face bearing axially against said first shoulder thereby forming a first static sealing interface therewith and an upstream side-face opposite said downstream side-face, and an inner circumferential face bearing against said shaft thereby forming a dynamic sealing interface therewith and an outer circumferential face substantially opposite said inner face, said outer face having a first face portion for communication with low fluid pressure on the downstream side of said housing and a second face portion for communication with high fluid pressure on the upstream side of said housing;

a backup ring between said primary ring and said second shoulder having:

a downstream side-face bearing axially against said seal ring upstream side-face thereby forming a second static sealing interface therewith and an upstream side-face substantially opposite said downstream side-face, and an inner circumferential face radially spaced from said shaft and axially spaced from the second face portion of said sealing ring for directing said high pressure against a part of said second face portion, and an outer circumferential face substantially opposite said inner face for communication with said low pressure;

a first biasing means connected to both said upstream face of said backup ring and said second shoulder in fluid-tight connection to form a first fluid path for directing said high pressure against the upstream and downstream faces of said backup ring and against the second face portion of said seal ring and for urging said backup ring against said seal ring, said first biasing means proportioned to exert a predetermined seating force for maintaining said first and second sealing interfaces in sealing engagement; a second biasing means urging said sealing ring against said shaft for maintaining said dynamic sealing interface in sealing engagement; and a second fluid path formed in said first shoulder in fluid communication with said high fluid pressure and with said first interface for directing said high pressure against the downstream side-face of said seal ring to substantially counteract the high fluid pressure acting against the upstream face of said seal ring, whereby said predetermined seating force between said mating surfaces of said first sealing interface will remain substantially constant regardless of the pressure differential between said high and low pressure.

3. The seal assembly of claim 2 wherein:

said upstream face of said backup ring is proportioned so that the axial force caused by said high pressure acting directly against it is substantially equal and opposite to the sum of the axial forces caused by said high pressure acting directly against a portion of said downstream face of said backup ring and by said high pressure acting indirectly against said backup ring at said second static interface;

whereby said backup ring remains substantially axially balanced regardless of changes in differential pressure between said upstream and downstream sides of said housing; and wherein said first biasing means is proportioned to exert a predetermined seating force urging said backup ring against said primary seal ring to maintain said rings in substantially constant static sealing relation at said second sealing interface regardless of changes in differential pressure between said upstream and downstream sides of said housing.

4. The seal assembly of claim 3 wherein:

said downstream side-face of said primary seal ring is proportioned so that both the axial force caused by said high pressure acting directly against said first sealing interface from said second fluid path and the axial force caused by said high pressure acting indirectly against said primary seal ring at said first static interface is substantially equal and opposite to the sum of the axial forces caused by said high pressure acting directly against both a portion of said upstream side-face of said primary seal ring and by said high pressure acting indirectly against said primary seal ring at said second static interface, whereby said primary seal ring remains substantially axially balanced regardless of changes in differential pressure between said upstream and downstream sides of said housing; and wherein said predetermined seating force exerted against said backup ring urges said primary seal ring against said first shoulder to maintain a substantially constant sealing pressure between said rings and said shoulder at said first and second interfaces regardless of changes in differential pressure between said upstream and downstream sides of said housing.

5. The seal assembly of claim 4, wherein:

said inner circumferential face of said primary seal ring includes a first inner face portion having a larger diameter than said shaft and in communication with said low pressure and further includes a second inner face portion having a diameter substantially the same as said shaft forming said dynamic sealing interface for separating said low pressure from said high pressure along said shaft;

said first shoulder includes a third fluid path formed therein for directing said low fluid pressure in communication with said annular cavity and surrounding said first face portion of said outer face of said primary seal ring;

said first inner face portion proportioned so that said lower pressure acting radially outwardly thereon is substantially equal and opposed to said low pressure acting radially inwardly on said first face portion of said outer face of said primary seal ring;

said second face portion of said outer face of said primary seal ring is radially opposite said dynamic sealing interface and in communication with said high pressure; and said second face portion proportioned so that said high pressure acting directly thereon is substantially equal and radially opposed to said high pressure acting indirectly on said dynamic sealing interface, whereby said primary seal ring remains substantially radially balanced regardless of changes in differential pressure between said upstream and downstream sides of said housing, said second biasing means exerting a predetermined seating force against said outer face portion of said primary seal ring thereby urging said second inner face portion against said shaft for maintaining a constant sealing pressure at said dynamic sealing interface regardless of changes in differential pressure between said upstream and downstream sides of said housing.

6. The apparatus of claim 5 wherein:

the segments of said segmented primary seal ring each include a male and female end, said male end of one segment mating with a corresponding female end of an adjacent segment, each of said female ends including a relief formed in said second inner face portion for reducing the area against which said high pressure acts indirectly against said face to compensate for radial forces tending to lift said segments away from said shaft at the intersection of said male and female ends.